United States Patent [19]
Kinzie, Jr. et al.

[11] 3,970,803
[45] July 20, 1976

[54] PRINTED SOUND TRACK SYSTEM

[75] Inventors: George R. Kinzie, Jr., Ridgefield; Daniel Gravereaux, Wilton, both of Conn.

[73] Assignee: CBS Inc., New York, N.Y.

[22] Filed: Feb. 14, 1975

[21] Appl. No.: 550,065

Related U.S. Application Data

[63] Continuation of Ser. No. 322,774, Jan. 11, 1973, abandoned.

[52] U.S. Cl. ............... 179/100.3 B; 179/100.1 C; 179/100.3 E; 360/2
[51] Int. Cl.² .................. G11B 7/08; G11B 7/18; G11B 7/24
[58] Field of Search ............ 179/100.3 B, 100.1 C, 179/100.3 E; 35/8 R, 35 C; 274/41.6; 360/2

[56] References Cited
UNITED STATES PATENTS

| | | | |
|---|---|---|---|
| 2,006,890 | 7/1935 | Grossman | 179/100.3 B |
| 2,369,572 | 2/1945 | Kallmann | 35/100.1 C |
| 2,451,014 | 10/1948 | Zworykin et al. | 250/214 |
| 2,851,539 | 9/1958 | Brown | 179/100.1 C |
| 3,238,501 | 3/1966 | Mak et al. | 179/100.1 C |
| 3,391,476 | 7/1968 | Sher | 35/35 C |
| 3,416,241 | 12/1968 | Weitzner | 35/35 |
| 3,737,875 | 6/1973 | Fujimoto | 35/100.3 B |

*Primary Examiner*—Raymond F. Cardillo, Jr.
*Attorney, Agent, or Firm*—Spencer E. Olson

[57] ABSTRACT

A system for generating audible information from indicia printed on a paper, the system being particularly applicable to indicia printed in ink by conventional printing techniques. A printed sound track is provided, the sound track being oriented on the paper in a direction defined as the manual scanning direction, this being the horizontal direction in most instances. The track consists of a multiplicity of elongated parallel sound track segments printed on the paper in closely spaced arrangement. The segments are oriented in a direction which is generally transverse a manual scanning direction, i.e., the vertical direction in most instances. Also provided is an optical scanner adapted to be manually scanned over the sound track in a manual scanning direction. The scanner includes automatic means for continuously scanning the segments longitudinally to produce electrical signals representative of audio information. Means are also provided for converting the electrical signals into audible signals.

6 Claims, 7 Drawing Figures

PRINTED SOUND TRACK SYSTEM

This is a continuation of application Ser. No. 322,774, filed Jan. 11, 1973, now abandoned.

BACKGROUND OF THE INVENTION

This invention relates to printed sound and, more particularly, to a system for generating audible information from indicia printed in ink on paper.

There have been various past attempts to produce a successful "talking book " which offer the reader, typically a child, audible guidance concerning the pictures and words he sees before him. The potential educational and amusement advantages of combined audio/-visual presentation from a book are well documented. However, schemes for providing a commercially feasible talking book have largely failed due to the expense of providing an acceptable audio recording media in the book.

The two most prevelant schemes involve magnetic tape stripes or embossed plastic grooves secured to the book pages. These schemes are both economically deficient in that they involve the attachment of special materials to the individual book pages during manufacture. Publishing is normally highly mechanized, and any procedure which substantially lengthens the manufacturing cycle or adds significant labor, material, or tooling costs would render the books produced thereby non-competitive from a price standpoint.

It has been previously suggested that sound patterns could be applied in ink to a printed page by conventional printing means and then recovered by a reader using a hand-held optical pick-up means. For example in the U.S. Pat. No. 3,474,194, of Lees and Kinzie, there is disclosed a system of this type wherein variable-area ink patterns and applied to a page for later reading using a hand-held optical transducer.

The use of printed sound patterns alleviates the manufacturing problems referred to, but new problems relating to the mode of storage and the reading thereof immediately become apparent. The resolution capabilities of printing ink on standard quality paper are limited so the efficiency of this storage media from an information-content standpoint is a basic problem. The inability to obtain very finely distinguishable ink lines results in the usage of relatively large areas to record even a short segment of speech information. It would, for example, be desirable to provide a printed sound track directly underneath the printed text to which it applies, but the inordinate amount of space required using conventional sound track techniques renders this difficult at best since a large percentage of the page would then be needed for the sound track. To illustrate, the U.S. Pat. No. 2,369,572 of H. Kallman discloses a "dictionary" wherein each line of a page consists of a single printed word followed by what appears to be a variable-area sound track. It has been found that offset printing of sound tracks is practicable only up to about 200 cycles per inch. A minimum bandwidth of about 2000 cycles per second is necessary to represent normal speech components. Therefore, if it is assumed that the individual sound tracks of the Kallman patent are four inches long, it follows that each sound track contains less than half a second of minimum quality audible speech. This amount of sound track would be barely sufficient for a single word, much less an audio presentation of a group of words or a whole sentence.

Further problems of printed sound tracks relate to practical limitations in the optical transducer used to read and play the track. The optical unit cannot, of course, be unduly expensive. Generally, it is envisioned that the optical means would be manually scanned over the track thereby obviating the need for sophisticated optical scanning equipment. Manual scanning, however, gives rise to new problems that relate to the coordination and dexterity of the person handling the scanning means. First of all, the conventional printed sound track would be susceptible to frequency variations which are a function of manual scanning speed. This would result in words becoming blurred or unintelligible if the scanning speed during a line was varied significantly from the prescribed speed. A further problem of manual scan concerns physical registration of the scanning head with the sound track. Most systems would suffer severe degradation in the event that the user did not scan a relatively straight line that covered the desired track in its entirety. Also, provision must be made to minimize the possibility of the scanner overlapping (and therefore extraneously reading) printed text or adjacent tracks at the same time. Normally, this requires a relatively large empty or "dead" space between a line of sound track and other printed material, a clearly wasteful alternative. The combination of length-consuming sound tracks and the large dead space between tracks leaves little room for conventional printed material on a page.

It is an object of the present invention to provide a novel system for generating audible information from indicia printed on paper, the system substantially overcoming many of the disadvantages listed hereinabove.

SUMMARY OF THE INVENTION

The present invention is directed to a system for generating audible information from indicia printed on a paper and is particularly applicable to indicia printed in ink by conventional printing techniques. A printed sound track is provided, the sound track being oriented on the paper in a direction defined as the manual scanning direction, this being the horizontal direction in most instances. The track consists of a multiplicity of elongated parallel sound track segments printed on the paper in closely spaced arrangement. The segments are oriented in a direction which is generally transverse the manual scanning direction; i.e., the vertical direction in most instances.

In accordance with an embodiment of the invention there is also provided an optical scanner adapted to be manually scanned over the sound track in the manual scanning direction. The scanner includes automatic means for continuously scanning the segments longitudinally to produce electrical signals representative of audio information. Means are also provided for converting the electrical signals into audible signals.

Further features and advantages of the invention will become more readily apparent from the following detailed description when taken in conjunction with the accompanying drawings.

DESCRIPTION OF THE PREFERRED EMBODIMENT

Figure 1:
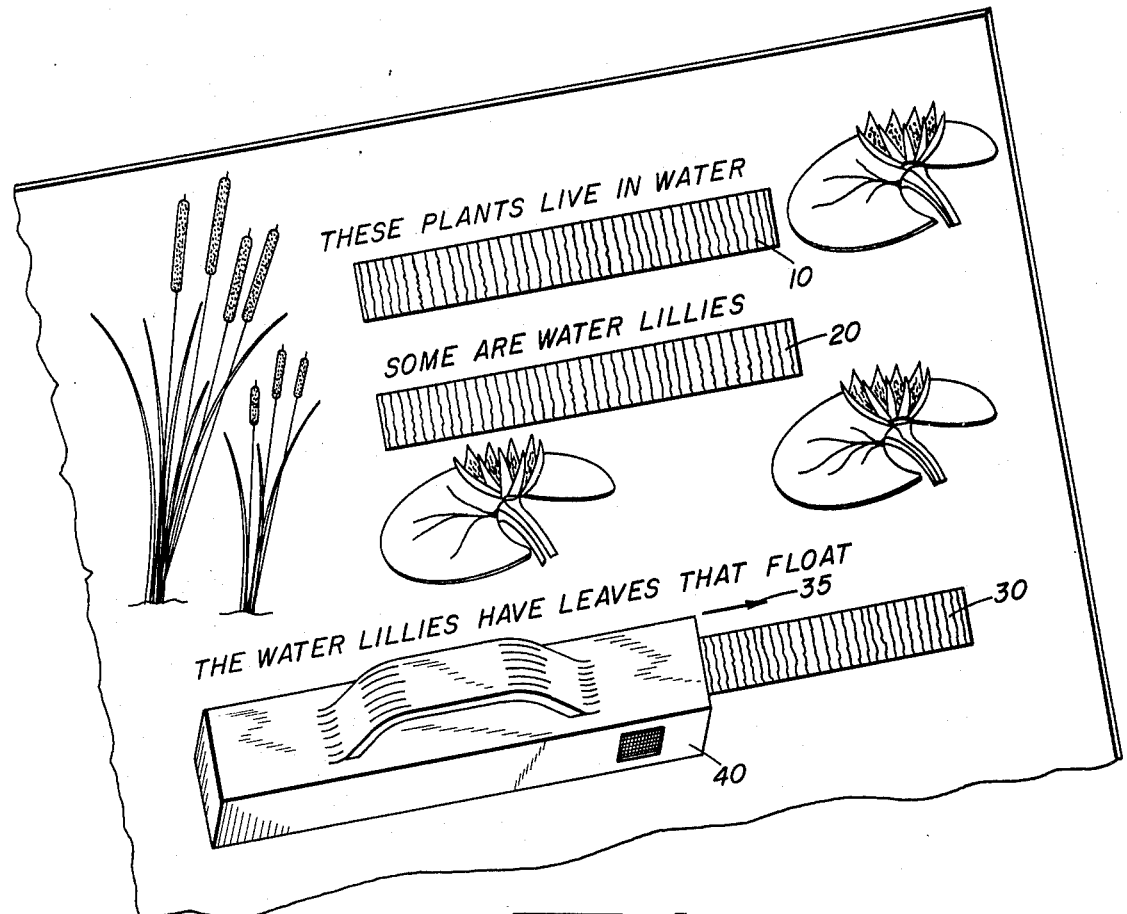
FIG. 1 illustrates a portion of a page in a children's book which includes printed sound tracks in accordance with the invention.

Referring to FIG. 1 there is shown a portion of a page in a children's book which includes printed sound tracks in accordance with the invention. Three tracks designated by the reference numerals 10, 20 and 30 are shown positioned below sentences of the printed text to which they correspond. FIG. 1 also shows a model of a manual scanner or player 40 which is illustrated as being utilized to scan the track 30 and which presently covers a portion thereof.

The printed sound tracks in accordance with the present invention, designated as "folded" sound tracks, are adapted to be manually scanned in a first direction by the player 40 while optical means within the player automatically scan the track in a second direction that is generally transverse the first direction. In FIG. 1 the manual scanning direction is the horizontal direction in which the sound tracks extend and scanning is performed manually in this direction as is indicated by the arrow 35. Each of the sound tracks 10, 20 and 30 consist of a multiplicity of elongated parallel printed sound track segments which are illustrated in further detail in the enlarged portion of FIG. 2 wherein the individual segments are denoted by the reference letter S. The sound track segments S are vertically oriented in closely spaced relationship. Adjacent track segments are arranged in a manner which gives rise to signals representing continuous audio information when the segments are consecutively scanned longitudinally by automatic optical scanning means in the player 40. In essence, this is achieved by lining up consecutive audio representative track segments in order, much as if one long continuous sound track had been cut into segments of equal length and then "folded" into the desired configuration.

Figure 2:
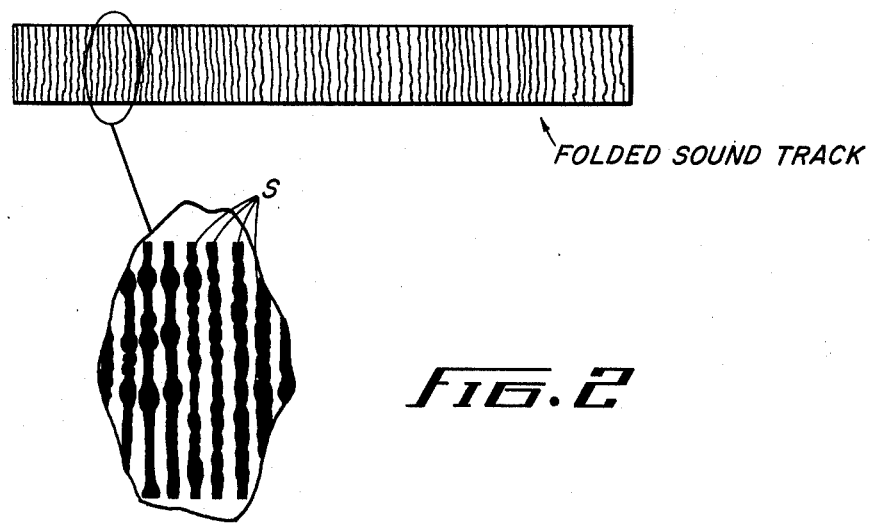
FIG. 2, and especially the enlarged portion thereof, shows the individual sound track segments of the present invention in further detail.

In the present embodiment, as illustrated in FIG. 2, the sound track segments are of the well known variable-area type wherein the width of the track segment at any point along its length varies in accordance with a prescribed signal value at that point. By optically scanning the track longitudinally at the appropriate rate, a signal of desired amplitude and pitch is obtained. In the present invention the rate at which individual track segments are scanned longitudinally does not substantially depend on the manual scanning rate, so the frequencies of individual sound elements are not particularly sensitive to changes in the manual scanning rate. This feature of the invention will become more readily apparent from subsequent description of the operation of the manual scanner or player 40.

Figure 3:
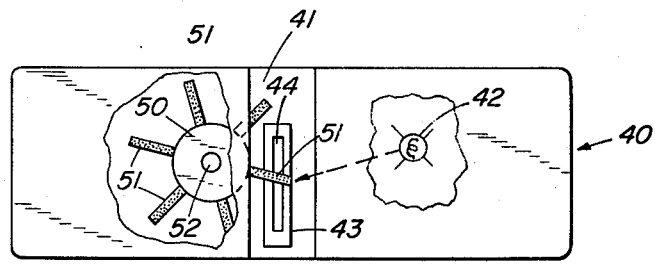
FIG. 3 is a bottom partially cutaway view of an embodiment of a player in accordance with the invention.
Figure 4:
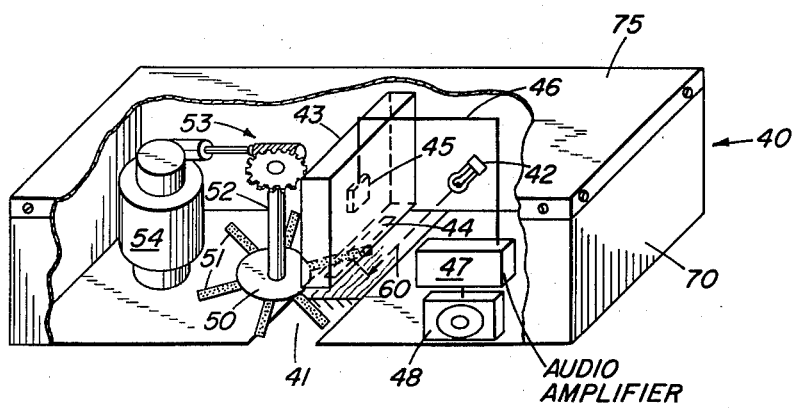
FIG. 4 is a side elevational partially cutaway view of the player of FIG. 3.

Referring to FIGS. 3 and 4, there is shown an embodiment of a player 40 in accordance with the invention. The player housing 70 is generally rectangular in shape and has a removable cover 75. The bottom of the player is seen to be a smooth flat surface that is, for the most part, opaque. A central rectangular portion 41 of the bottom surface is formed of a transparent material, such as a plastic panel. A light source, in the form of a bulb 42 mounted to an inner sidewall of housing 70, emits light which illuminates the area lying below the transparent panel 41. Mounted just above the panel 41 is an opaque plastic enclosure 43. The enclosure 43 can be secured to a sidewall of the housing 40 by any suitable means (not shown). The enclosure 43 has an elongated thin window or slit 44 in its bottom surface being positioned above the transparent portion 41 by a small distance, for example, 0.25 inch.

A photodetector element 45, which may comprise a semiconductor photodiode, is mounted within the enclosure 43 and oriented so as to receive the light entering the slit 44. The output of photoconductor 45 is coupled via a wire 46 to audio amplifier 47 which is, in turn coupled to a small speaker 48.

Positioned next to and slightly below the bottom of enclosure 43 is a wheel 50 having six teeth 51 extending radially therefrom. The wheel 50 has a shaft 52 which is rotatably mounted in a bushing (not shown) that is seated in the bottom of the enclosure 40. The shaft 52 extends upwardly to engage a simple mechanical drive gear meachnism 53 which is driven by a small electric motor 54 secured to the bottom of the housing 70. The motor 54, photodetector 55, lamp 42 and audio amplifier 47 are all powered by a small dry cell battery (not shown) which may be of the conventional 9-volt variety.

The wheel 50 is positioned and the teeth 51 proportioned in a manner such that a given tooth completely traverses the slit 44 and masks a portion thereof before the next rotating tooth begins to traverse the slit. In other words, the teeth are spaced such that only a single tooth area at a time masks the slit and a new tooth begins traversal of the slit just as the previous tooth is completing its traversal.

Figure 5:
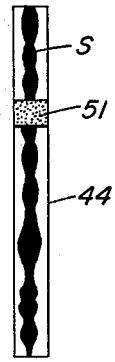
FIG. 5 shows a sound track segment as "seen" by a photodetector element in the player of FIG. 3.

In operation, the player 40 is positioned over the sound track in the manner shown in FIG. 1 so that slit 44 is substantially parallel to the longitudinal track segments, S. The lamp 42 illuminates the group of sound track segments that lie below the transparent panel 41 as is illustrated by the dashed line 60. FIG. 5 shows the type of scene that is "viewed" by the photodetector 45 through the slit 44. The slit width is about one hundredth inch and corresponds approximately to the width of a single sound track segment S. In FIG. 5 the illustrated sound track segment S happens to be approximately centrally located under the slit, but it will be appreciated that at times the photodetector will be "looking" at portions of two successive segments. In the present embodiment the wheel 50 rotates at a 1,000 rpm and, since there are six scans per wheel revolution (i.e. six teeth), this means there are 6,000 scans per minute or 100 scans per second. Thus each longitudinal track segment, typically one-half inch long, contains only 10 milliseconds of speech, so there is substantial waveform redundancy as between adjacent track segments and it is not critical that individual segments be scanned independently. In fact, while the present embodiment indicates a particular slit width that has been found suitable, it should be pointed out that the acceptable slit width range is somewhat flexible because echo from adjacent tracks is not noticeable. If a wider slit width is utilized, the photodetector can be oriented so as to have maximum sensitivity down the center of the slit to effect a de-emphasis of pre or post echo.

In FIG. 5 the tooth is seen to mask the light from a portion of the track segment S. This type of scan, wherein the reading of the track is accomplished by blanking a small portion of the track segment rather than by viewing only a correspondingly small portion of the track segment, is found to be advantageous, although the opposite type of scan can be implemented if desired. In the illustrated scan, the average amount of light viewed by the photodetector through the slit (in the absence of the scanning tooth) is a constant reference or DC level that is established during recording of the sound track segments and is a function of the slit width. Therefore variations in the amount of light "blocked out" by the scanning tooth 51 at any instant represents the varying audio signal. A feature of the present embodiment is that the surface of the teeth 51 is gray and is provided with a light reflection gray level which equals the normal average light level seen through the slit. This feature is particularly advantageous in an economical system wherein the registration between the tooth leaving the slit and the next tooth entering the slit is not one of perfect precision. If, for example, the tooth were black, there could be undesirable signal spikes at the entering/leaving transitions. In the present case, the tooth reflectivity yields an average signal level so that registration problems of this sort do not cause large transients.

Figure 6:
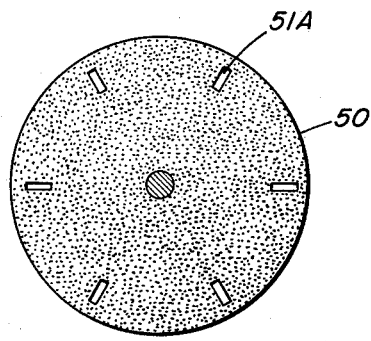
FIG. 6 shows an alternate form for the scanning wheel of the embodiment of the player of FIG. 3.

FIG. 6 illustrates a type of wheel 50 that can be utilized to achieve the type of scan, referred to above, where only a small portion of the track segment is viewed (rather than blanked) at a time. In this arrangement, six apertures 51A are arranged in positions that correspond to the six teeth 51.

It can now be appreciated that the present invention overcomes much of the disadvantage associated with prior art printed sound track systems. The rate at which individual track segments are scanned longitudinally is constant and does not substantially depend on the manual scanning rate, so the pitch of individual sound elements are not particularly sensitive to changes in the manual scanning rate. The speed at which the sentence is uttered will vary with the scanning rate, but the words retain intelligibility over a substantial range of manual scanning speeds. There will, in fact, be a continuous sound output even if the manual scanner is stopped at a particular position. In such case, the sound output may typically be an individual phoneme that is drawn out continuously. The invention also effectively solves the "space" problem associated with prior art printed sound track systems in that an entire short sentence can be applied to an area that requires only the space of two or three lines of text material. The "echo" effect as between adjacent sound track segments allows economies of space without requiring an unduly complex or expensive player mechanism.

Figure 7:
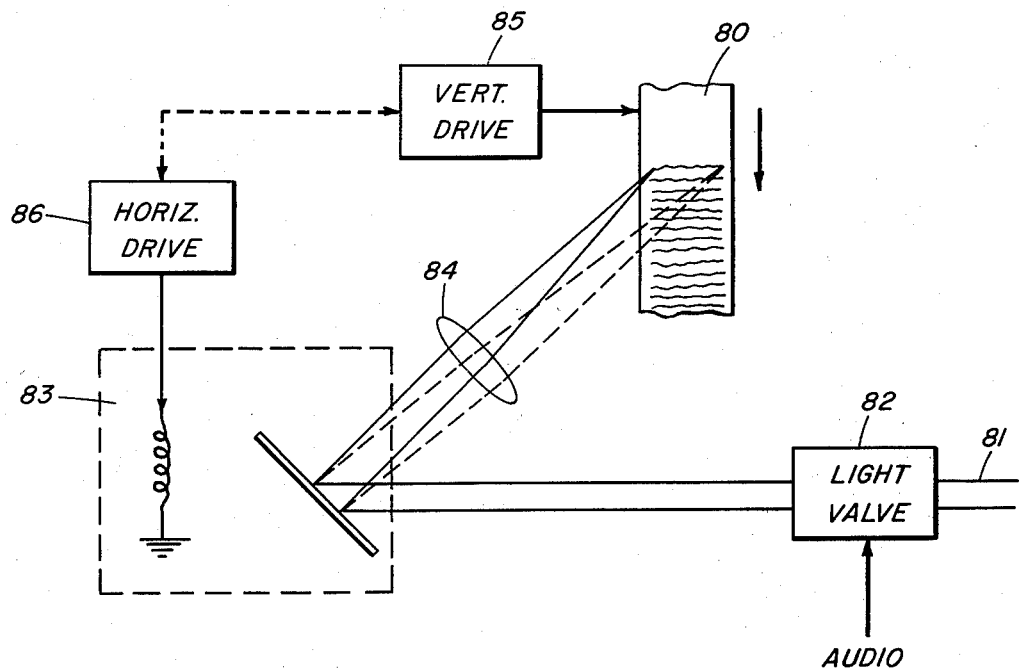
FIG. 7 shows a simplified block diagram of a system for recording sound tracks in accordance with the invention.

FIG. 7 shows a simplified block diagram of a system that can be utilized to record the sound track of the invention on a film 80, the film to be later utilized in making a master for printing. A collimated light beam 81 is directed through an electro-optic light valve 82 which receives as its other imput an electrical signal representing the audio information to be recorded. The light valve shutter is modulated by the audio signal to achieve an aperture size which is a function of the audio information. The beam 81, now modulated in aperture, is reflected from a galvanometer mirror 83 which imparts horizontal deflection to the beam in well known manner. The beam is focused by a lens 84 onto the film 80 where individual scanlines; i.e. individual longitudinal sound track segments, are recorded. The film is advanced by means (not shown) controlled by conventional film drive circuitry 85 that is synchronized with horizontal drive circuitry 86 which, in turn, controls the horizontal scanning of the galvanometer mirror. A length of recorded film strip, for example, four inches, will thus contain a single sound track such as the track 10 of FIG. 1. It will be appreciated that various alternate schemes for the recording of the sound track will occur to those skilled in the art.

The invention has been described with reference to a particular embodiment, but it will be appreciated that variations are possible within the spirit and scope of the invention. As an example, the sound track and player could be designed such that the successive longitudinal scans would be back-and-forth rather than in a single direction.

We claim:

1. A system for generating audible information from indicia printed on a paper comprising:

a sound track oriented on said paper in a manual scanning direction, said track consisting of a multiplicity of elongated parallel sound track segments of the variable area-type printed on said paper in closely spaced arrangement, the segments being oriented in a direction which is generally transverse the manual scanning direction, said segments being arranged in an order which represents sequential portions of the complete sound information contained in said track, adjacent segments having a substantial degree of waveform redundancy;

an optical scanner adapted to be manually scanned over said track in the manual scanning direction, the scanner including automatic means for continuously scanning the segments longitudinally to produce electrical signals representative of audio information; and means for converting said electrical signals into audible sounds.

2. The system as defined by claim 1 wherein said sound track is printed on said paper in ink.

3. The system as defined by claim 1 wherein the width of said scan is sufficiently wide to overlap successive segments during said scan.

4. A manual scanning apparatus for scanning a sound track oriented on a paper in a manual scanning direction, the sound track consisting of a multiplicity of elongated parallel sound track segments printed on said paper in closely spaced arrangement, the segments being oriented in a direction which is generally transverse the manual scanning direction, comprising:

a housing having a generally flat bottom portion adapted to rest on said paper over said track;

an elongated scanning window in said bottom portion, said window having a length comparable to the length of said segments and adapted for orientation substantially parallel the segments;

means for performing a periodic longitudinal scan along the scanning window, said means comprising a rotating mechanism having a plurality of teeth which successively mask a portion of the track segments visible through said scanning window;

photodetector means for detecting the amount of light reflected from the area beneath the scanning window; and means for converting the photodetector output into an audible sound.

5. The apparatus as defined by claim 4 wherein said teeth have a partial reflectivity of light, said reflectivity being substantially equal to the average reflected light level visible through the area of said scanning windown.

6. A manual scanning apparatus for scanning a sound track oriented on a paper in a manual scanning direction, the sound track consisting of a multiplicity of elongated parallel sound track segments printed on said paper in closely spaced arrangement, the segments being oriented in a direction which is generally transverse the manual scanning direction, comprising:
   a housing having a generally flat bottom portion adapted to rest on said paper over said track;
   an elongated scanning window in said bottom portion, said window having a length comparable to the length of said segments and adapted for orientation substantially parallel the segments;
   means for performing a periodic longitudinal scan along the scanning window, said means comprising a rotating mechanism having a plurality of apertures which successively expose a portion of the track segments visible through said scanning window;
   photodetector means for detecting the amount of light reflected from the area beneath the scanning window; and
   means for converting the photodetector output into an audible sound.

* * * * *